United States Patent Office 3,655,703
Patented Apr. 11, 1972

3,655,703
ORGANOTIN MERCAPTOACID ESTER STABILIZERS FOR VINYL HALIDE RESIN COMPOSITIONS AND COMPOSITIONS STABILIZED THEREWITH
Samuel Hoch, Brooklyn, N.Y., assignor to Tenneco Chemicals, Inc.
No Drawing. Filed Jan. 5, 1970, Ser. No. 807
Int. Cl. C07f 7/22; C08f 45/56
U.S. Cl. 260—429.7
16 Claims

ABSTRACT OF THE DISCLOSURE

A stabilizer for vinyl halide resin compositions comprises an organotin compound, such as dibutyltin bis-(isooctyl thioglycolate), and a small amount of an alkyl acid phosphate. These stabilizers, unlike the untreated organotin compounds, are stable for long periods at room temperature. Their use results in vinyl halide resin compositions that have improved color and heat stability.

---

This invention relates to stabilizers for halogen-containing resins and to resinous compositions stabilized therewith. More particularly, it relates to stabilizers for vinyl halide resin compositions that comprise an organotin compound and an alkyl acid phosphate.

A number of organotin compounds are known to be good heat stabilizers for vinyl halide resin compositions. None of these compounds has proven to be entirely satisfactory for this use because some of them are not stable and start to decompose to form inactive crystalline products on standing for as little as one day at room temperature; others are not readily soluble or are insoluble in the commonly-used organic solvents; and still others are characterized by undesirable odors.

In accordance with the present invention, it has been found that the incorporation into certain organotin compounds of a small amount of an alkyl acid phosphate as hereinafter defined yields products that have a substantially reduced tendency to decompose on standing and that are more effective than the untreated organotin compounds as stabilizers for vinyl halide resins.

One group of organotin compounds that may be stabilized in accordance with this invention comprises organotin marcaptoacid esters, which are condensation products of esters of mercaptoacids with organotin halides or oxides. The preparation of these compounds and their use are described in U.S. Pat. 2,641,588 (Leistner and Knoepke), U.S. Pat. 2,641,596 (Leistner and Hecker), and U.S. Pat. 2,648,650 (Weinberg and Johnson). The organotin mercaptoacid esters have the structural formula $$R°_mSnY_{4-m}$$

wherein R° represents an alkyl, oxyalkyl, aryl, oxyaryl, aralkyl, or cycloalkyl group, Y represents an ester of a mercaptoacid having from 2 to 6 carbon atoms whose sulfur atom is linked to the tin atom, and m is a number in the range of 1 to 3. Illustrative of these compounds are the following: monobutyltin tris-(cyclohexyl thioglycolate), dihexyltin bis-(hexyl thiopropionate), triphenyltin butyl thiovalerate, tricyclohexyltin benzyl thiocaproate, and the like. The invention is of particular value in the stabilization of alkyltin thioglycolates that have the structural formula $$R°°_mSn(SCH_2COOR')_{4-m}$$

wherein R°° represent an alkyl group having from 4 to 8 carbon atoms, R' represents an alkyl group having from 4 to 8 carbon atoms or an aryl, aralkyl, alkaryl, or cycloalkyl group, and m is a number in the range of 1 to 3.

These include, for example, dibutyltin bis-(butyl thioglycolate), tributyltin isooctyl thioglycolate, octyltin tris-(benzyl thioglycolate), dibutyltin bis-(cyclohexyl thioglycolate), and the like.

Another group of organotin compounds that may be stabilized in accordance with this invention are basic organotin compounds that have the structural formula

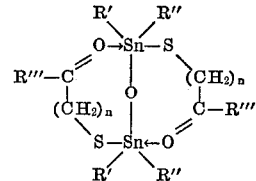

wherein each R' and R'' represents an alkyl group having from 4 to 8 carbon atoms, an alkaryl group, an aralkyl group, a cycloalkyl group, or an anaryl group; each R''' represents an alkoxy group having 1 to 18 carbon atoms; and each n represents an integer in the range of zero to one. Illustrative of these chelate complexes is basic dibutyltin bis-(isooctyl thioglycolate), which has the structure

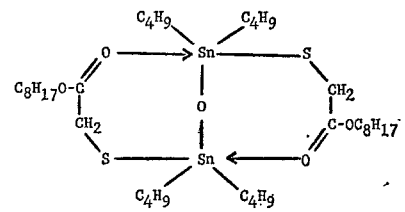

The preparation and properties of these basic organotin compounds are described in my pending application Ser. No. 672,985, which was filed on Oct. 5, 1967, which is now U.S. Pat. No. 3,555,060.

The alkyl acid phosphates that may be used to stabilize the organotin compounds include monoalkyl acid phosphates having the structural formula $$(RO)(HO)_2P=O$$

dialkyl acid phosphates having the structural formula $$(RO)_2(HO)P=O$$

and mixtures of these alkyl acid phosphates. In each of the forgoing formulas R represents an alkyl group having from 1 to 10 carbon atoms. Illustrative of the useful alkyl acid phosphates are methyl acid phosphate, isopropyl acid phosphate, n-butyl acid phosphate, hexyl acid phosphate, 2-ethylhexyl acid phosphate, n-octyl acid phosphate, n-decyl acid phosphate, sec.-isoamyl acid phosphate, and the like. While a single alkyl acid phosphate may be used, in most cases it is preferred to use a mixture that contains at least one monoalkyl acid phosphate and at least one dialkyl acid phosphate.

The alkyl acid phosphate may be prepared by any suitable and convenient procedure. For example, they may be prepared by reacting from 2 to 4 moles of an appropriate alcohol with one mole of phosphorus pentoxide. It is generally preferred that about 3 moles of alcohol be used per mole of phosphorus pentoxide so that the product formed will contain both monoalkyl and dialkyl acid phosphates. The alcohols that may be used in the preparation of the alkyl acid phosphates are primary, secondary, and tertiary alkanols that have straight-chains or branched-chains and that have from 1 to 10 carbon atoms. These include methanol, ethanol, propanol-1, propanol-2, butanol-1, 2-methylpropanol-1, butanol-2 (methylethyl carbinol), tertiary butyl alcohol (trimethylcarbinol), pentanol-1, 2-methylbutanol-1, neopentyl alcohol, secondary isoamyl alcohol (methylisopropylcarbinol) hexanol - 1,2,2 - dimethylbutanol-1,2-ethylhexanol, octanol-1, decanol-1, decanol-2, and the like.

The stabilizers of this invention may be prepared by adding to an organotin compound an amount of an alkyl acid phosphate that is sufficient to inhibit the decomposition of the organotin compound and to minimize the precipitation of crystalline decomposition products therein. The stabilizer composition of this invention usually contain about 0.10 part to 5.0 parts by weight of the alkyl acid phosphate per 100 parts by weight of the organotin compound. Particularly advantageous results have been obtained when the stabilizer contained 0.25 part to 1.0 part by weight of the alkyl acid phosphate per 100 parts by weight of the organotin compound. The stabilizer compositions may be prepared by mixing the organotin compound with the alkyl acid phosphate at room temperature.

The vinyl halide resins that may be stabilized with the organotin stabilizers of this invention are the resinous products obtained by the polymerization of a vinyl halide in the presence or absence of a copolymerizable monomer. The term "vinyl halide resin" as used herein includes vinyl halide homopolymers, such as polyvinyl chloride and polyvinyl bromide, as well as vinyl halide copolymers including those formed by the polymerization of a vinyl halide with a comonomer such as vinyl acetate, vinyl propionate, vinyl butyrate, vinylidene chloride, styrene, methyl methacrylate, dialkyl fumarate or maleate, and the like. The vinyl halide is ordinarily and preferably the chloride, but the bromide and fluoride may also be used. The copolymers useful in the practice of this invention are those that contain at least 70 percent of vinyl halide units and up to 30 percent of the comonomer units. The invention is also applicable to mixtures of vinyl halide resins in a major proportion with a minor proportion of another synthetic resin, such as chlorinated polyethylene, polyacrylate and polymethacrylate esters, and terpolymers of acrylonitrile, butadiene, and styrene. In addition to the vinyl halide resin and stabilizer, the compositions may also contain plasticizers such as dioctyl phthalate, dibutyl sebacate, tricresyl phosphate and octyl diphenyl phosphate, lubricants, other heat and light stabilizers such as epoxidized oils and polyhydric alcohols, pigments, dyes, extenders, solvents, and other resin additives in the amounts ordinarily employed for the purpose indicated.

Only a small amount of the novel stabilizer composition need be present in the vinyl halide resin compositions of this invention. It has been found that as little as 1 percent of the stabilizer composition based on the weight of the vinyl halide resin composition, will bring about an appreciable improvement in the heat and light stability of the composition. Approximately 10 percent or more of the stabilizer composition can be used, but these larger amounts generally do not provide further improvement in the properties of the resinous composition and for this reason are not ordinarily used. While the amount of the stabilizer composition that will provide optimum stability depends upon such factors as the choice of stabilizer components and the choice of vinyl halide resin, in most cases 2 percent to 6 percent of the stabilizer composition, based on the weight of the vinyl halide resin composition, is used.

The stabilized vinyl halide resin compositions are generally prepared by blending the stabilizer composition with the vinyl halide resin using plastic mixing rolls at a temperature at whch the mixture is fluid and milling the composition on a two-roll mill at from 300° F. to 400° F. for a time sufficient to form a homogeneous sheet. Other additives may be incorporated with the stabilizer. The stabilized composition may then be removed from the mill in the form of a sheet or film of the desired thickness which may be used as such or subjected to a polishing or embossing treatment.

The invention is further illustrated by the examples that follow. In these examples, all parts are parts by weight unless otherwise specified.

EXAMPLE 1

A mixture of 641 parts (3.11 moles) of isooctyl thioglycolate which had been prepared by the esterification of thioglycolic acid with isooctanol, 387 parts (1.56 moles) of dibutyltin oxide, and 430 parts of benzene was heated at its reflux temperature (80°–98° C.) until 28 parts of water had been collected by azeotropic distillation. The reaction mixture was heated to 127° C. to remove the benzene. The product was cooled and filtered with clay. The dibutyltin bis-(isooctyl thioglycolate) obtained was a clear, water-white liquid. After standing at room temperature for five days, this product contained a substantial amount of a white crystalline precipitate.

EXAMPLE 2

A freshly-made sample of dibutyltin bis-(isooctyl thioglycolate), which had been made by the procedure of Example 1, was mixed at room temperature with 0.25 percent of its weight of secondary isoamyl acid phosphate. This phosphate had been prepared by reacting three moles of methyl isobutyl carbinol with one mole of phosphorus pentoxide.

The resulting mixture was a clear solution that remained clear on standing at room temperature for one month.

EXAMPLES 3–6

The procedure described in Example 2 was repeated using the indicated amounts of various alkyl acid phosphates, each of which was a mixture of monoalkyl and dialkyl acid phosphates.

| Example Number | Alkyl acid phosphate used | Amount of phosphate added (percent) |
| --- | --- | --- |
| 3 | Secondary isoamyl acid phosphate | 0.50 |
| 4 | n-Butyl acid phosphate | 0.25 |
| 5 | do | 0.50 |
| 6 | 2-ethylhexyl acid phosphate | 0.50 |

The products of Examples 3–6 were clear solutions that remained clear on standing at room temperature for more than one month.

EXAMPLE 7

Stabilized polyvinyl chloride resin compositions were prepared by the following procedure:

To a mixture of 100 parts of polyvinyl chloride (Tenneco 10R), 15 parts of an acrylonitrile-butadiene-styrene terpolymer (Blendex 401), 3 parts of an acrylic resin (K–120N), 1.4 parts of glyceryl monoricinoleate, and 0.5 part of stearyl stearate was added 2 parts by weight of either a stabilizer of this invention or a comparative stabilizer. The mixtures were blended at room temperature and then charged to a two-roll, steam-heated mill whose roll surface was maintained at 340° F. The mixtures were milled for 5 minutes and then removed from the mill as flexible, homogeneous sheets 45 mils thick. The heat stability of the compositions was determined by placing 1 x 1 inch specimens which had been cut from the milled sheets in a forced-circulation oven at 375° F. and removing specimens periodically until degradation was complete as indicated by color change. Press polished plaques having a thickness of 75–85 mils were prepared in a Watson-Stillman press at 350° F. The results obtained are summarized in Table I.

TABLE I

| Stabilizer | Color after 10 minutes at 375° F. | Color of pressed sheet |
| --- | --- | --- |
| Product of Ex. 1 | Yellow | Slightly yellow. |
| Product of Ex. 2 | Very slightly yellow | White. |
| Product of Ex. 3 | do | Do. |
| Product of Ex. 4 | do | Do. |
| Product of Ex. 5 | do | Do. |
| Product of Ex. 6 | do | Do. |

EXAMPLE 8

The procedure described in Example 7 was repeated using the same formulation to which 0.0011 part of a blue toner (Alizarin Irisol Blue) had been added to emphasize the color changes that occurred on heating. The results obtained are summarized in Table II.

TABLE II

| Stabilizer | Color after 10 minutes at 375° F. | Color of pressed sheet |
| --- | --- | --- |
| Product of Ex. 1 | Yellow | Very slightly blue. |
| Product of Ex. 2 | Slightly blue | Blue. |
| Product of Ex. 3 | do | Do. |
| Product of Ex. 4 | do | Do. |
| Product of Ex. 5 | do | Do. |
| Product of Ex. 6 | do | Do. |

From the data in Tables I and II it will be seen that the compositions that contained the stabilizers of this invention (products of Examples 2–6) had better early color hold and better sheet color than did the comparative composition that contained as stabilizer only dibutyltin bis-(isooctyl thioglycolate), the product of Example 1.

EXAMPLE 9

A mixture of 320.5 parts (1.556 moles) of isooctyl thioglycolate, 193.5 parts (0.778 mole) of dibutyltin oxide, and 215 parts of benzene was heated at its reflux temperature (85°–100° C.) until 14 parts of water had been collected by azeotropic distillation. An additional 19.3 parts (10 molar percent excess) of dibutyltin oxide was added, and the heating was continued until the oxide had reacted. The reaction mixture was heated in a nitrogen atmosphere to 120° C. to remove the benzene. The product was cooled and filtered with clay. The basic dibutyltin isooctylthioglycolate obtained was a clear, yellow-amber liquid. On standing at room temperature for 5 days, this product contained a substantial amount of a white crystalline precipitate.

EXAMPLE 10

A freshly-made sample of basic dibutyltin isooctylthioglycolate, which had been made by the procedure of Example 9, was mixed at room temperature with 0.5 percent of its weight of secondary isoamyl acid phosphate. The resulting mixture was a clear solution that remained clear on standing at room temperature for three months.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. A stabilizer for vinyl halide resins that comprises (a) an organotin compound selected from the group consisting of (1) organotin mercaptoacid esters having the structural formula

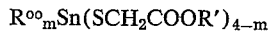

wherein $R^{oo}$ represents an alkyl group having from 4 to 8 carbon atoms; $R'$ represents an alkyl group having from 4 to 8 carbon atoms, an aryl group, an aralkyl group, an alkaryl group, or a cycloalkyl group; and $m$ represents a number in the range of 1 to 3; (2) basic organotin compounds having the structural formula

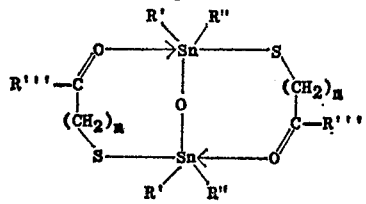

wherein each $R'$ and $R''$ represents an alkyl group having from 4 to 8 carbon atoms, an aryl group, an alkaryl group, an aralkyl group, or a cycloalkyl group; each $R'''$ represents an alkoxy group having from 1 to 18 carbon atoms; and each $n$ represents a number in the range of zero to one; and (3) mixtures thereof; and (b) about 0.10 percent to 5.0 percent by weight, based on the weight of said organotin compound, of an alkyl acid phosphate component selected from the group consisting of monoalkyl acid phosphates, dialkyl acid phosphates, and mixtures thereof, in which each alkyl group has from 1 to 10 carbon atoms.

2. A stabilizer composition as set forth in claim 1 wherein the organotin compound is dibutyltin bis-(isooctyl thioglycolate).

3. A stabilizer composition as set forth in claim 1 wherein the organotin compound is basic dibutyltin isooctylthioglycolate.

4. A stabilizer composition as set forth in claim 1 that contains 0.25 percent to 1.0 percent by weight of said alkyl acid phosphate.

5. A stabilizer composition as set forth in claim 1 wherein the alkyl acid phosphate is butyl acid phosphate.

6. A stabilizer composition as set forth in claim 1 wherein the alkyl acid phosphate is 2-ethylhexyl acid phosphate.

7. A stabilizer composition as set forth in claim 1 wherein the alkyl acid phosphate is sec.-isoamyl acid phosphate.

8. A stabilizer composition as set forth in claim 1 wherein the alkyl acid phosphate component is a mixture of a monoalkyl acid phosphate and a dialkyl acid phosphate.

9. The method for the stabilization of organotin compounds selected from the group consisting of (1) organotin mercaptoacid esters having the structural formula

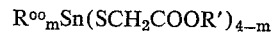

wherein $R^{oo}$ represents an alkyl group having from 4 to 8 carbon atoms; $R'$ represents an alkyl group having from 4 to 8 carbon atoms, an aryl group, an aralkyl group, an alkaryl group, or a cycloalkyl group; and $m$ represents a number in the range of 1 to 3; (2) basic organotin compounds having the structural formula

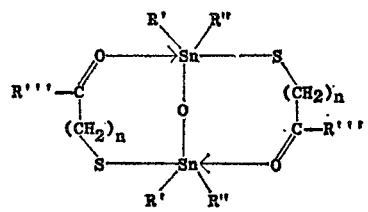

wherein each $R'$ and $R''$ represents an alkyl group having from 4 to 8 carbon atoms, an alkaryl group, an aralkyl group, a cycloalkyl group, or an aryl group; each $R'''$ represents an alkoxy group having from 1 to 18 carbon atoms; and each $n$ represents a number in the range of zero to one; and (3) mixtures thereof that comprises adding to said organotin compounds about 0.10 part to 5.0 parts by weight per 100 parts by weight of said organotin compound of an alkyl acid phosphate selected from the group consisting of monoalkyl acid phosphates, dialkyl acid phosphates, and mixtures thereof, in which each alkyl group has from 1 to 10 carbon atoms.

10. The method of claim 9 wherein the phosphate is 2-ethylhexyl acid phosphate.

11. The method of claim 9 wherein the phosphate is a mixture of a monoalkyl acid phosphate and a dialkyl acid phosphate.

12. The method of claim 9 wherein the organotin compound is dibutyltin bis-(isooctyl thioglycolate).

13. The method of claim 9 wherein the organotin compound is basic dibutyltin isooctylthioglycolate.

14. The method of claim 9 wherein 0.25 part to 1.0 part by weight of said alkyl acid phosphate is added per 100 parts by weight of the organotin compound.

15. The method of claim 9 wherein the phosphate is butyl acid phosphate.

16. The method of claim 9 wherein the phosphate is secondary isoamyl acid phosphate.

References Cited

UNITED STATES PATENTS 2,832,750  4/1958  Weinberg et al. ____ 260—429.7

TOBIAS E. LEVOW, Primary Examiner

W. F. W. BELLAMY, Assistant Examiner

U.S. Cl. X.R.

260—45.75 K